April 7, 1942.   P. WEIEN   2,278,503

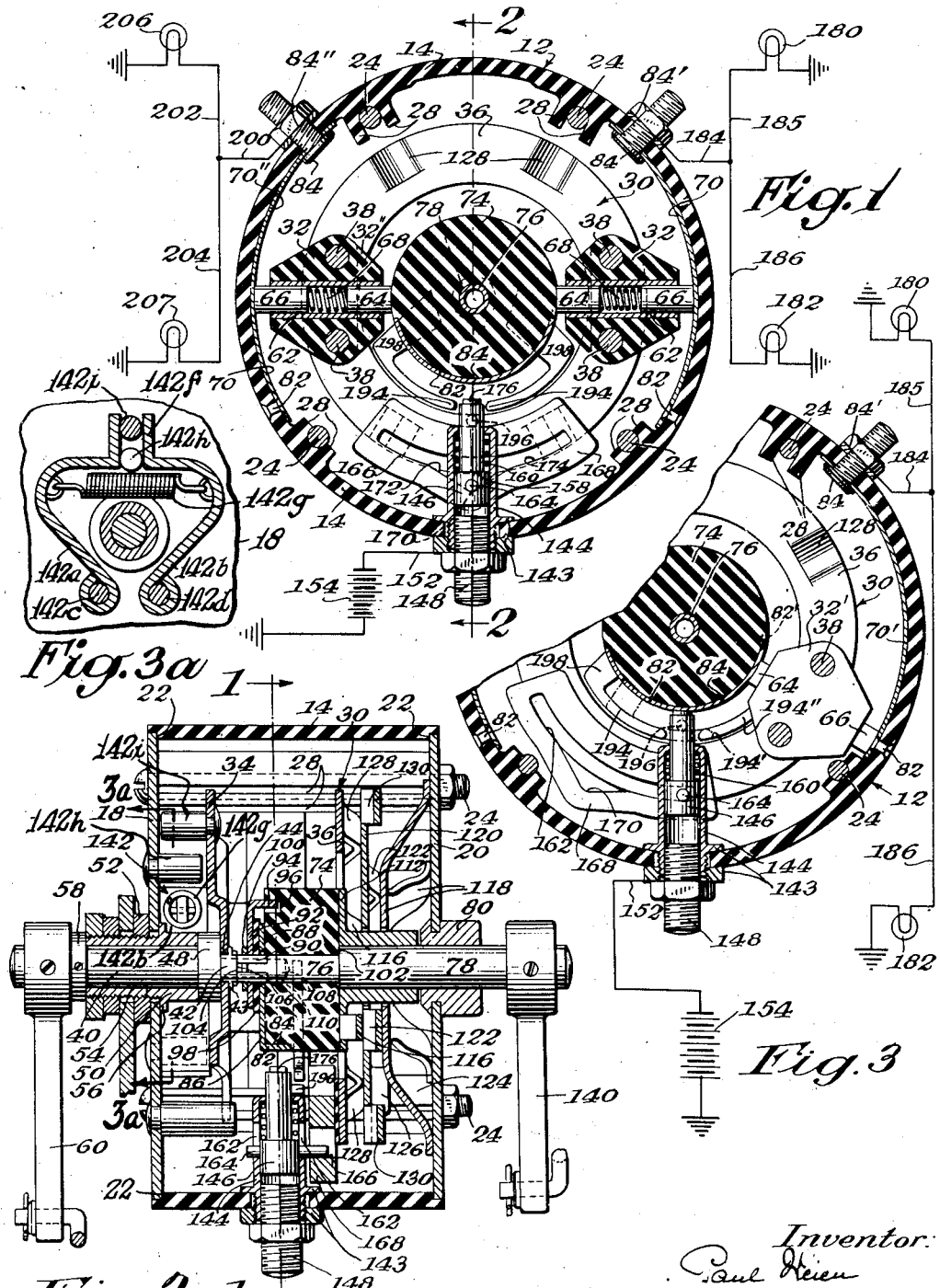

SIGNAL SWITCH

Filed Jan. 3, 1941   2 Sheets-Sheet 2

Inventor:
Paul Weien
By Dike, Calver & Gray
Attorneys

Patented Apr. 7, 1942

2,278,503

UNITED STATES PATENT OFFICE 2,278,503

SIGNAL SWITCH

Paul Weien, Marietta, Pa., assignor of one-half to Henry S. Rich, Jr., Marietta, Pa.

Application January 3, 1941, Serial No. 372,955

13 Claims. (Cl. 200—59)

This invention relates to electrical direction signal systems for automotive vehicles and more particularly to a switch for controlling the opening and closing of the various signal circuits of such a system.

My prior Patent No. 1,910,869, May 23, 1933, shows a switch which may not only be manually set for closing either right or left turn signal circuits, but the same also automatically closes the right or left turn signal circuits on steering the vehicle into a right or left turn, respectively. To this end, the switch comprises a pair of relatively movable members having contacts which are disengaged in the neutral position of both members and engage each other to close right or left turn signal circuits on movement of either member from its neutral position in opposite directions, respectively. One member, hereafter called "automatic member," is moved by the steering mechanism of the vehicle and is in neutral position when the vehicle moves in a straight direction, while the other member, hereafter called "manual member," is manually movable from a neutral position in either direction and normally spring-urged into its neutral position. However, the manual member is locked against rotation on having been turned from its neutral position in either direction through a preassigned distance, and is automatically released when the automatic member is moved from its neutral position by the steering mechanism. Thus, while the signal circuits for a particular turn may be closed by manipulating the manual member into the corresponding operative position, the same circuits remain closed until the vehicle completes the signalled turn even though the manual member has in the meantime been released and spring-returned to its neutral position. However, this is true only if the automatic member is moved by the steering mechanism from its neutral position in a direction commensurate with the manual setting of the switch. Thus, if the switch is manually set for a left turn signal, for instance, and the vehicle subsequently negotiates a right turn instead of the indicated left turn, the left turn signal circuits will be opened the moment the vehicle starts to turn to the right and the right turn signal circuits will be closed on movement of the automatic member from its neutral position relative to the manual member which has meanwhile been released and spring-returned to its neutral position. If the switch is not manually set for a signal and the vehicle turns in either direction, the corresponding signal circuits will be automatically closed by reason of the movement of the automatic member relative to the manual member in its neutral position.

The present application is a continuation in part of my copending application Serial No. 305,637, filed November 22, 1939, which shows and describes a switch that performs like the above-described switch as far as the manual operation of the same is concerned, but which does not perform automatically, i. e., fails to close any signal circuits while the manual switch member is in its neutral position even though the automatic switch member is moved from its neutral position by the steering mechanism.

It is the aim and object of the present invention to devise a number of other switches alternative to the one shown and described in my mentioned copending application.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 1 is a section through a switch which embodies the present invention, the section being taken substantially on the line 1—1 of Fig. 2.

Fig. 2 is a cross-section through the switch taken on the line 2—2 of Fig. 1.

Fig. 3 is a fragmentary section of the switch, showing certain elements thereof in a different position of operation.

Fig. 3a is a reduced fragmentary section taken substantially on the line 3a—3a of Fig. 2.

Figure 4:
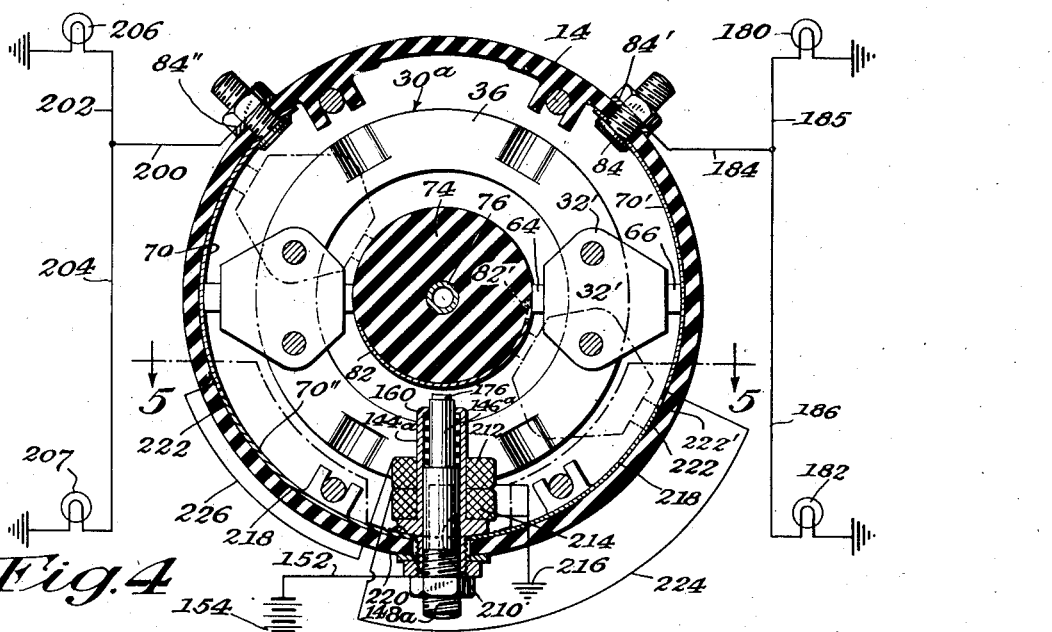
Fig. 4 is a section through a modified signal switch.

Referring to the drawings and particularly Figs. 1 to 3 thereof, the reference numeral 12 designates a direction signal switch having a cylindrical housing 14 in which the various switch elements are located. The open ends of the housing 14, which is preferably molded of "Bakelite," are closed by cover plates 18 and 20 (Fig. 2) whose peripheries rest in annular recesses 22 of said housing. A plurality of bolts 24 secure the cover plates 18, 20 to the housing 14. The bolts 24 are preferably straddled by inwardly projecting lugs 28 on the housing 14.

Rotatable in the switch housing is the "manual member" which takes the form of a carrier 30 for two brush holders 32 and consists of two metal plates 34 and 36 between which said brush holders are mounted diametrically opposite each other by means of studs 38 that extend through said brush holders and plates and are suitably secured to the latter, thereby also securing the plates in spaced relation to each other. Projecting from the end plate 34 is a stub shaft 40 (Fig. 2) whose reduced end 42 may be provided with flats in its otherwise cylindrical periphery to engage the walls of a square hole 44 in said end plate 34, while spaced portions of said reduced shaft end 42 may be crimped at 43 against the end plate 34 to permanently secure the latter to a collar 48 integral with the stub shaft 40. The stub shaft 40 is journalled in a bearing sleeve 50 which is secured to the cover plate 18 of the switch housing by a nut 52 which is received by a threaded portion 54 of said bearing sleeve and retains an annular shoulder 56 of the latter in engagement with said cover plate 18. The collar 48 of the stub shaft 40 is retained in engagement with the adjacent end of the bearing sleeve 50 by an adjustable collar 58 which abuts the other end of said bearing sleeve. Mounted on the stub shaft 40 is a lever 60 through intermediation of which the brush carrier 30 is to be turned in either direction in a manner referred to hereinafter.

Each brush holder 32 is made of any suitable insulating material and preferably provided with a conductive sleeve 62 in which two brushes 64 and 66 are slidable. Located in the sleeve 62 of each brush holder and interposed between the brushes therein in a compression spring 68 which urges the brush 66 into permanent engagement with a conductive track 70 and the brush 64 into permanent engagement with the periphery of a rotor 74 of any suitable insulating material. Each conductive track 70 is secured to the inner wall of the switch housing 14 by a rivet 82 and a terminal 84, for instance, while the rotor 74 is mounted on the reduced end 76 of a stub shaft 78 which is journalled coaxially of the stub shaft 40 in a bearing member 80, suitably mounted on the cover plate 20 of the switch housing. The rotor 74 carries in any suitable manner a circular conductor 82. In the present instance, the rotor 74 is provided with a peripheral recess 84 to receive the conductor 82 which is in form of a depending circular flange on a plate 86 (Fig. 2) that rests against the rotor face 88 and has an opening through which the reduced shaft end 76 extends with such clearance as to avoid contact with said plate 86. The foremost portion of the reduced shaft end 76 is preferably provided with four spaced flats 90 in its otherwise cylindrical periphery which engage the walls of a square hole in a metal washer 92 that is provided with a depending nose 94 which projects into an aperture 96 in the rotor 74, thereby securing said rotor to the stub shaft 78 for combined rotation with the same. An insulating washer 98 is interposed between the washer 92 and the plate 86 of the conductor 82 to prevent grounding of the latter by way of the washer 92 and the stub shaft 78. Angularly spaced portions of the reduced shaft end 76 are preferably crimped at 100 against the washer 92, thereby retaining the rotor 74 in permanent engagement with an annular shoulder 102 on the stub shaft 78. An annular shoulder 104 on the stub shaft 40 (Fig. 2) abuts the adjacent end 106 of the reduced end 76 of the other stub shaft 78, and projecting from the shoulder 104 is a further reduced shaft end 108 which is received in a bore 110 in the reduced shaft end 76, thus providing a further journal bearing for the axially alined stub shafts 40, 78. Suitably mounted on the stub shaft 78 or secured to the rotor 74 is a metal disk 112 which has a plurality of equi-angularly spaced, punched-out cams 116 that are generally V-shaped. Urged against the disk 112 by a conventional star spring 118 is a non-rotatable but axially movable lock disk 120 which has equi-angularly spaced depressions 122 that conform in number to the cams 116 and are arranged concentric to the latter and formed by punching out portions of the disk 120 in the manner illustrated in Fig. 2. The lock disk 120 is held non-rotatable by at least two diametrically opposite studs (one being shown at 124 in Fig. 2) which project from the cover plate 20 of the switch housing and slidably receive sleeve-like projections 126 of said lock disk. The end plate 36 of the brush carrier, which is in form of a ring to admit the rotor 74, is provided with a number of equi-angularly spaced, punched-out cams 128 which preferably conform in shape to the cams 116, while the lock disk 120 has the same number of additional equi-angularly spaced depressions 130 which are arranged concentric to the cams 128 and preferably formed by punching out portions of said lock disk. It is not deemed necessary to show the relative disposition of the various cams 116, 128 and depressions 122, 130 as that is fully disclosed in my mentioned co-pending application Serial No. 305,637. The following explanation will suffice in order to understand the coaction between these various cams and depressions. In the neutral position of the brush carrier 30 and rotor 74 (Figs. 1 and 2), the cams 128 on the axially immovable brush carrier are located centrally between the depressions 130 in the lock disk 120 and hold the latter depressed, while the cams 116 on the axially immovable rotor 74 aline, but do not register, with the inner depressions 122 in the lock disk. When the rotor 74 is in neutral position and the brush carrier 30 is turned from neutral position in either direction (through 30° in the present instance) into either of the two "operative" positions, of which one is shown in Fig. 3, the cams 128 on the brush carrier will come into alinement with the depressions 130 on the lock disk and the latter will thereupon be urged by the star spring 118 to the left as viewed in Fig. 2 until the depressions 130 register with the cams 128 and the other depressions 122 in the lock disk register with the rotor cams 116. The then registering cams 128 and depressions 130 on the brush carrier and in the lock disk, respectively, yieldingly arrest said brush carrier against rotation from either "operative" position. Thus, the brush carrier is yieldingly arrested in either operative position until the lock disk 120 is depressed to an extent that its depressions 130 clear the cams 128. Depression of the lock disk 120 to that extent is accomplished by forcibly turning the brush carrier from its present "operative" position or by turning the rotor 74 from its neutral position in either direction in a manner to be described more fully hereinafter. Rotation of the rotor 74 from its neutral position causes the cams 116 thereof to depress the lock disk 120 in order to clear the depressions 122 thereof, whereby the other depressions 130 also clear the cams 128 on the brush carrier and permit the return of the latter to its neutral position.

The brush carrier 30 is normally yieldingly urged into its neutral position by structure generally indicated at 142 (Fig. 2) and more fully shown in Fig. 3a. More particularly, two levers 142a and 142b are pivotally mounted at 142c and 142d, respectively, on the cover plate 18 of the switch housing. The straight ends 142e and 142f of the levers 142a and 142b, respectively, are normally urged by a tension spring 142g into engagement with a post 142h on the cover plate 18. Projecting from the end plate 34 of the brush carrier is a stud 142i which is of the same diameter as the post 142h and projects between the straight lever ends 142e and 142f. When both lever ends 142e and 142f engage the post 142h as shown in Fig. 3a, the brush carrier 30 is in its neutral position (Fig. 1). However, on turning the brush carrier into either operative position, one of the levers 142a, 142b will be swung by the stud 142i away from the post 142h against the tendency of the spring 142g to return said lever into the position shown in Fig. 3a, i. e., into engagement with the post 142h. The force of the spring 142g, which urges the brush carrier 30 into its neutral position, is not large enough to release the brush carrier in either "operative" position from locking engagement with the lock disk 120, but is large enough to quickly return the brush carrier to its neutral position once the lock disk is depressed and the brush carrier released for rotation.

Mounted at 143 in the switch housing is a conductive sleeve 144 (Figs. 1 and 2) in which a brush 146 is slidable. Threaded into the sleeve 144 is a terminal post 148 to which is connected a lead 152 from any suitable source of electric current, such as a storage battery 154. Located in the sleeve 144 is a compression spring 160 which urges the brush 146 into the retracted position shown in Fig. 1, i. e., out of conductive engagement with the rotor conductor 82. The sleeve 144 has in its cylindrical wall two diametrically opposite, elongated slots 162 (Fig. 2) through which extend the ends of a stud or follower 164 of the brush 146. Cooperating with one end of the follower 164 is a cam groove 166 in a cam block 168 which is insulatingly mounted in any suitable manner on the end plate 36 of the brush carrier. In the neutral position of the brush carrier 30 the follower 164 rests against the apex 170 of a V-shaped portion of the cam groove 166 (Fig. 1), with the result that the brush 146 assumes the retracted position shown in Fig. 1. On rotating the brush carrier 30 from its neutral position into either "operative" position, the follower 164 of the brush 146 will cooperate with the V-shaped portion of the cam groove 166 to bring said brush 146 into engagement with the rotor conductor 82. In order to assure uniform contact between the rotor conductor 82 and the brush 146, the latter is provided in any suitable manner with a slightly yieldable tip 176.

Thus, when the brush carrier 30 is rotated from its neutral position (Fig. 1) to the "operative" position shown in Fig. 3, for instance, current will flow from the battery 154 through lead 152, terminal post 148, sleeve 144, brush 146, rotor conductor 82, the brushes 64, 66 in the brush holder 32', conductive track 70', terminal 84', and leads 184, 185 and 186 to grounded signal filaments 180 and 182. The signal filaments 180 and 182 may be located in front and back, respectively, and on the right side, for instance, of a vehicle to indicate right turns. Thus, when the brush carrier 36 is turned from its neutral position into the operative position shown in Fig. 3, the described circuits through the right turn signal filaments 180 and 182 are closed by the action of the cam groove 166 in the cam block 168.

The rotor-carrying shaft 78 is preferably so connected in any suitable manner with the steering mechanism of the vehicle that the rotor assumes its neutral position (Fig. 1) when the vehicle proceeds in a straight direction, is rotated from neutral position in a clockwise or counterclockwise direction (Fig. 1) on turning the vehicle to the left or right, respectively, and is returned to neutral position on bringing the vehicle back into a straight direction of movement. This driving connection, which forms no part of the present invention, may be like the one shown in my copending application Serial No. 305,638, filed November 22, 1939, now Patent No. 2,236,280, March 25, 1941. The brush carrier 30 may be manually rocked in any suitable manner from its neutral position into either "operative" position in which the same becomes locked to the disk 120 as previously explained. For instance, the brush carrier 30 may be rocked by a manual actuator which is located on the hub of the steering wheel of the vehicle and mounted at the upper end of an actuator shaft which extends through the hollow steering shaft that carries the steering wheel, all as shown in my copending application Serial No. 298,794, filed October 10, 1939. The driving connection between the lower end of this actuator shaft and the brush carrier 30 may be like the one shown in my copending application Serial No. 298,794, filed October 10, 1939.

Thus, while the vehicle proceeds in a straight direction and the switch has already been manually set for a right signal indication (Fig. 3), the brush carrier 30 will remain locked in the "operative" position shown in Fig. 3. As soon as the vehicle starts to turn to the right, the rotor 74 starts to turn from its neutral position in a counterclockwise direction as viewed in Fig. 3 and cause the release of the brush carrier from the lock disk 120. To release the brush carrier from the lock disk, however, the rotor will have to turn from its neutral position to such an extent that the conductor 82 reaches approximately the dot-and-dash line position 82' in which the same will remain in contact with the brush 64 in the holder 32' when the brush carrier is spring-returned to its neutral position. Hence, the circuits through the right signal filaments 180 and 182 are not interrupted by the return of the brush carrier 30 into its neutral position. The return of the brush carrier 30 into its neutral position also brings the apex 170 of the cam groove 166 into realignment with the follower 164 of the brush 146, but the latter is then prevented from retracting from the rotor conductor 82 by one of two arcuate fingers 194 on the rotor 74 which has in the meantime moved into the dot-and-dash line position 194' (Fig. 3), i. e., into holding engagement with another follower 196 of the brush 146. The fingers 194 are insulatingly mounted in any suitable manner on the rotor 74. For instance, these fingers may be molded with their shank 198 in the rotor 74 in the manner indicated in Fig. 1.

It will now be understood that one of the fingers 194 holds the brush 146 in contact with the rotor conductor 82 while the vehicle negotiates the indicated right turn and until the same is substantially brought back into a straight direction of movement, at which time the rotor returns also to its neutral position and the brush-holding finger 194 clears the follower 196 and permits the brush 146 to return to its normal, retracted position. Retraction of the brush 146 from the rotor 74 causes opening of the circuits through the right signal filaments 180 and 182. Subsequent turns of the vehicle in the absence of previous manual settings of the switch do not cause automatic closing of the left or right turn signal circuits, as the only element capable of forcing the brush 146 into engagement with the rotor conductor 82 is the cam block 168 which assumes the neutral position shown in Fig. 1 as long as the switch is not manually set.

If it is desired to signal a left turn, the operator manipulates the brush carrier 30 from its neutral position in a counterclockwise direction as viewed in Fig. 1, whereupon the brush carrier becomes locked to the disk 120 and the left turn signal circuits are closed. These left turn signal circuits would be closed through the battery 154, lead 152, brush 146, rotor conductor 82, the brushes 64 and 66 in the holder 32'', the conductive track 70'', terminal 84'', leads 200, 202, 204 and the grounded left signal filaments 206 and 207 which are on the left side, and in front and back, of the vehicle.

If the operator of the vehicle sets the switch for a right turn signal (Fig. 3) while proceeding in a straight direction and thereafter makes a left turn, the right turn signal circuits will be opened as soon as the vehicle starts to negotiate the left turn. This is due to the fact that the brush carrier is returned to neutral position when the vehicle starts a left turn and the rotor 74, instead of turning counter-clockwise as viewed in Fig. 3 and remaining in contact with the brush 64 in holder 32', turns clockwise, i. e., away from said brush 64. However, the brush-holding finger 194'' on the rotor 74 will, on clockwise rotation of the latter (Fig. 3) from its neutral position, move into holding engagement with the follower 196 of the brush 146 and retain the same in contact with the rotor conductor 82. Moreover, the rotor conductor 82 will soon move into contact with the brush 64 in the holder 32'' (Fig. 1) and close the signal circuits through the left signal filaments 206 and 207, as will be readily understood. Hence, the present switch is self-corrective to the extent that the signals corresponding to the actual turn of the vehicle will be automatically turned on once the operator has manually set the switch for an opposite turn, and the wrong signals for said opposite turn will automatically go off when the correct signals go on.

Figure 5:
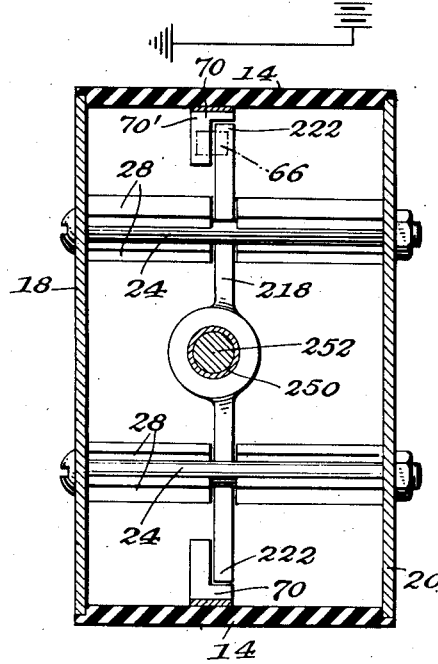
Fig. 5 is a section taken substantially on the line 5—5 of Fig. 4.

While the switch just described has a mechanical control over the retractable feed brush 146, Fig. 4 illustrates a switch in which the control over the same brush is electrical. More particularly, the normally retracted brush 146a is forced into contact with the rotor conductor 82 by an electro-magnetic force and is retained in contact therewith by the same force. To this end, the brush 146a (Fig. 4) in the conductive sleeve 144a is either made of any suitable magnetizable conductor material or the same has a readily magnetizable iron core, such as the core 210, for instance. Suitably mounted on the sleeve 144a are two separate solenoid windings 212 and 214 which have one end grounded at 216 in any suitable manner. The windings 212 and 214 are such that either one will, when energized, force the brush 146a into contact with the rotor conductor 82. Suitably mounted on the inner wall of the switch housing is a conductive strip 218 (see also Fig. 5) whose central portion is in contact with the conductive sleeve 144a at 220 and whose ends 222 are coextensive with, but do not engage, the adjacent ends of the conductive tracks 70 as best shown in Fig. 5. The track 70' is suitably connected by a conductor 224 with the solenoid winding 214, while the opposite track 70'' is connected by a conductor 226 with the other solenoid winding 212.

When the operator manipulates the brush carrier 30a into the dot-and-dash line position (Fig. 4) for the indication of a right turn, the brush 66 in the brush holder 32' will bridge the conductive track 70' and the adjacent end 222 of the conductive strip 218 in the manner indicated in dot-and-dash lines in Fig. 5, whereupon current will flow from the battery 154 through lead 152, terminal post 148a, conductive sleeve 144a, conductive strip 218, brush 66 in brush holder 32', conductive track 70' and conductor 224 to the solenoid winding 214, thereby energizing the latter and forcing the retracted brush 146a into contact with the rotor conductor 82. Current will then also flow from the track 70' through the leads 184, 185 and 186 to the right signal filaments 180 and 182 and light the same. As soon as the brush 146a contacts the rotor conductor 82, current will flow through said brush, rotor conductor 82, the brushes 64 and 66 in the holder 32', conductive track 70', terminal 84', and the leads 184, 185 and 186 to the right signal filaments 180, 182.

Inasmuch as the switch shown in Fig. 4 has the same provisions as the switch in Figs. 1 and 2 for locking the brush carrier in either "operative" position and for spring-returning the same to its neutral position on rotation of the rotor 74 from its neutral position in either direction, it will be understood that the brush carrier will return to the neutral, full-line position as soon as the vehicle starts to negotiate the indicated right turn. Such return of the brush carrier into neutral position brings about the disengagement of the brush 66 in the holder 32' from the conductive strip 218 and, consequently, interruption of the above described energizing circuit for the solenoid winding 214. However, since the rotor conductor 82 will be moved approximately into the dot-and-dash line position 82' by the time the brush carrier returns to its neutral position, the energizing current for the solenoid winding 214, while ceasing to flow by way of the conductive strip 218, will then flow by way of the brush 146a, rotor conductor 82, the brushes 64 and 66 in the holder 32', conductive track 70' and conductor 224, until the rotor returns to its neutral position at the end of a negotiated right turn of the vehicle. Shortly before the rotor reaches its neutral position, the rotor conductor 82 moves out of engagement with the brush 64 in the holder 32', with the result that the circuits through the right signal filaments 180, 182 and the energizing circuit for the solenoid winding 214 become opened. The right signal filaments will then go out and the brush 146 retract from the rotor conductor 82. The closing of the circuits through the left signal filaments 206 and 207 on manipulation of the brush carrier from neutral position in a counterclockwise direction as viewed in Fig. 4 is self-evident and requires no further description.

Whereas the switch shown in Fig. 1 is self-corrective to the extent that it will automatically correct signals, the switch in Fig. 4 will turn off wrong signals but not correct them. Thus, if the operator of the vehicle sets the switch for a right turn as indicated by the dot-and-dash line position of the brush carrier in Fig. 4, and he thereupon negotiates a left turn, the brush carrier will be returned to its neutral position as before but the rotor conductor 82 will this time move away from the brush 64 in the holder 32' due to the clockwise rotation of the rotor 74 in conformity with a left turn of the vehicle. Thus, the circuits through the right signal filaments 180, 182 and the energizing circuit of the solenoid winding 214 will be opened when the vehicle starts to negotiate the left turn.

Figure 6:
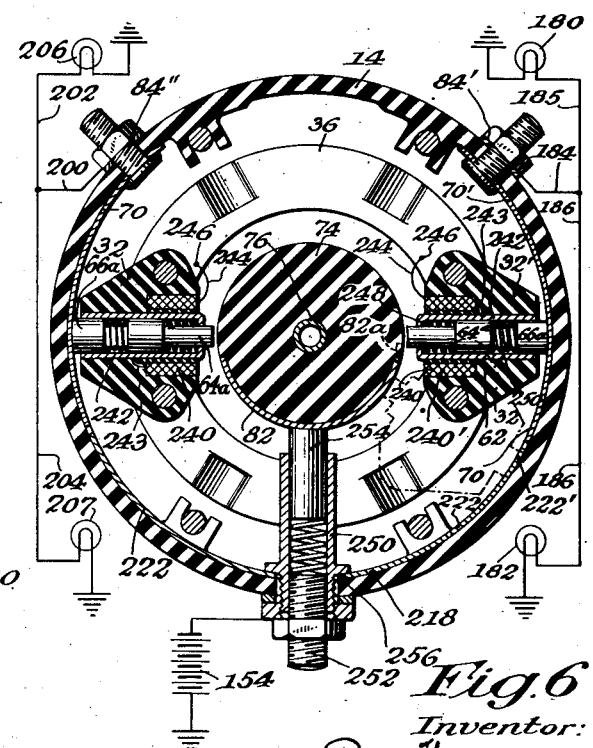
Fig. 6 is a section through another modified signal switch.

Fig. 6 discloses a modified switch in which the brushes 64a in the holders 32 are electrically controlled. To this end, a solenoid winding 240 is suitably insulatingly mounted on a conductive sleeve 242 in each brush holder 32. One end of each winding 240 is suitably connected at 243 with the conductive sleeve 242 while the other end thereof is suitably grounded as by a lead 244 which is connected at 246 with the grounded end plate 36 of the brush carrier. Slidable in each conductive sleeve 242 are the brushes 64a and 66a. Springs 248 normally hold the brushes 64a retracted from the rotor 74 while springs 250 between the brushes 64a, 66a hold the brushes 66a in permanent contact with the conductive tracks 70 regardless of the position of the brushes 64a. The conductive sleeve 250, which receives a terminal post 252 and a feed brush 254, is in permanent contact at 256 with a conductive strip 218 whose ends 222 are coextensive with, but slightly spaced from, the adjacent ends of the conductive tracks 70 (see also Fig. 5). The feed brush 254 is spring-urged into permanent contact with the rotor conductor 82 while the terminal post 252 is connected with a battery 154 by a lead 152.

On contemplating a right turn, for instance, the operator manipulates the brush carrier into a position in which the brush holder 32' assumes the dot-and-dash line position shown in Fig. 6 in which the brush 66a in said holder 32' bridges the conductive strip 218 and track 70', whereupon current will flow from the battery 154 through lead 152, terminal post 252, conductive sleeve 250, conductive strip 218, brush 66a in holder 32', conductive track 70', terminal 84', and leads 184, 185 and 186 to the grounded right signal filaments 180 and 182. Current will also flow from the track 70' through the brush 66a in holder 32' and the conductive sleeve 242 therein to the solenoid winding 240' which is grounded, thereby energizing the latter and forcing said brush 64a into contact with the rotor conductor 82. The brush carrier is locked in either operative position and is spring-returned to neutral position when the rotor 74 is rotated from its neutral position, the same as in the previously described switches. Thus, when the vehicle starts the indicated right turn, the rotor 74 will be rotated counterclockwise as viewed in Fig. 6 and the brush carrier will be spring-returned to the neutral full-line position when the rotor conductor 82 has reached the dot-and-dash line position 82a. Hence, the rotor conductor 82 remains in contact with the brush 64a in the holder 32' after the brush carrier has returned to neutral position so that the energizing circuit for the solenoid winding 240' remains closed, although the energizing current will not any more flow by way of the conductive strip 218 and conductive track 70', but by way of the feed brush 254, rotor conductor 82 and brush 64a in the holder 32'. Hence, the brush 64a in the holder 32' remains in contact with the rotor conductor 82 even after the brush carrier spring-returned to its neutral position and until the rotor 74 returns to its neutral position. When the rotor 74 returns to its neutral position, i. e., after the right turn is negotiated and the vehicle is about to proceed again in a straight direction, the rotor conductor 82 moves out of contact with the brush 64a in the holder 32' and the energizing circuit for the solenoid winding 240' and, hence, the right signal circuits, are opened as will be readily understood. The closing of the left signal circuits is self-evident and requires no further explanation. Of course, the present switch must be manually set in order to create signals, the same as the previously described switches. The present switch will also automatically turn off signals when the vehicle turns in a direction opposite to the signals, but will not correct false signals. In that respect the present switch functions like the switch shown in Fig. 4.

I claim:

1. In a signal switch, the combination of two movable members; two first contacts carried by one of said members insulated from each other; another contact adapted to be directly connected with a source of current; means establishing electrical connection between said other contact and said first contacts, respectively, on movement of a certain one of said members from a neutral position in opposite directions, respectively, relative to the other member in a neutral position, said means being inoperative on movement of said other member from its neutral position in either direction relative to said certain member in its neutral position; and means causing disengagement of the engaged contacts on relative movement between said members into their neutral relative position.

2. In a signal switch, the combination of two movable members; two first contacts carried by one of said members; another contact; means including a conductive bridge on the other member for establishing electrical connection between said other contact and said first contacts, respectively, on movement of said one member from a neutral position in opposite directions, respectively, relative to the other member in a neutral position, said means being inoperative on movement of said other member from its neutral position in either direction relative to said one member in its neutral position; and means causing disengagement of the engaged contacts on relative movement between said members into their neutral relative position.

3. In a signal switch, the combination of two movable members; two first contacts carried by one of said members; a conductive bridge carried by the other member; a second contact connectible with either of said first contacts through said bridge, one contact of each connectible contact pair being normally retracted from said bridge and the other contact thereof being normally urged toward said bridge; first means causing said one contact of the connectible contact pairs, respectively, to advance into engagement with said bridge and become electrically connected with the other contact thereof on movement of only said one member from a neutral position in opposite directions, respectively, relative to the other member in a neutral position; and other means causing the advanced contact of either contact pair to return to its retracted position on relative movement between said members into their neutral relative position.

4. The combination in a signal switch as set forth in claim 3, in which said second contact is normally retracted from the bridge, said first means comprise a cam on said one member for each of said connectible contact pairs, and said other means comprise a spring normally urging said second contact into its retracted position and a cam on said other member for each of said contact pairs to hold the advanced contact in its advanced position in any except the neutral position of said other member.

5. In a signal switch, the combination of two movable members; two first contacts carried by one of said members; a second contact; a conductor carried by the other member and adaptable as a bridge between said second contact and said first contacts, respectively, on movement of either member from a neutral position in opposite directions, respectively, one contact of each bridgeable contact pair being normally urged away from said conductor and the other contact thereof being normally urged toward said conductor; and electrical means forcing said one contact of the bridgeable contact pairs, respectively, into engagement with said conductor on movement of only said one member from its neutral position in opposite directions, respectively, said means becoming inoperative on relative movement between said members into their neutral relative position.

6. The combination in a signal switch as set forth in claim 5, in which said second contact is said one contact of both bridgeable contact pairs.

7. The combination in a signal switch as set forth in claim 5, in which said first contacts are said one contacts of the bridgeable contact pairs.

8. The combination in a signal switch as set forth in claim 5, in which said one contact of each bridgeable contact pair is magnetizable and said electrical means comprise a solenoid winding for each of said magnetizable contacts, two conductive tracks electrically connected with said windings, respectively, and engaged by said first contacts, respectively, in any position of said one member, and another conductive track electrically connected with said second contact and engaged by said first contacts, respectively, on movement of said one member from its neutral position in opposite directions, respectively.

9. In a signal switch, two relatively movable members; different sets of coactable contacts carried by said members and being normally disengaged regardless of the position of one of said members; means causing engagement between the contacts of said sets, respectively, on manual movement of the other one only of said members from a neutral position into opposite positions, respectively, relative to said one member in a neutral position; means returning said other member to its neutral position on movement of said one member from its neutral position in either of two opposite directions; and means causing disengagement of the engaged contacts on return of said one or said other member into its respective neutral position, depending on the direction of the preceding movement of said one member from its neutral position.

10. In a signal switch, a conductor; two relatively movable members, one member carrying contacts normally retracted from said conductor regardless of the position of the other member and said other member carrying said conductor; means moving said contacts, respectively, into engagement with said conductor on manual movement of only said one member from a neutral position into opposite positions, respectively, relative to the other member in a neutral position; means returning said one member to its neutral position on movement of said other member from its neutral position in either of two opposite directions; and means causing retraction of either engaged contact from said conductor on return of said one or said other member into its respective neutral position, depending on the direction of the preceding movement of said other member from its neutral position.

11. In a signal switch, two members independently rotatable coaxially of each other, one member having contacts and the other member having a concentric conductor from which said contacts are normally disengaged regardless of the angular position of said other member; means causing engagement between said conductor and said contacts, respectively, on manual rotation of only said one member from a neutral position in opposite directions into two operative positions, respectively, relative to the other member in a neutral position; means returning said one member from either operative position into neutral position on rotation of the other member from its neutral position in either of two opposite directions; and means causing disengagement between the conductor and the contact engaged therewith on return of said one or said other member into its respective neutral position, depending on the direction of the preceding rotation of said other member from its neutral position.

12. In a signal switch, two axially immovable and independently coaxially rotatable members; sets of coactable contacts, a contact of each set being carried by one of said members and each member having an axially projecting cam and said one member being normally urged into a neutral position; means causing engagement between the contacts of said sets, respectively, on manual rotation of said one member from its neutral position in opposite directions into two operative positions, respectively, relative to the other member in a neutral position; and a non-rotatable locking plate yieldingly urged against said cams and so cooperating with the latter that said one member is locked in either operative position to said plate when said other member is in its neutral position and is released from said plate when the cam of said other member, on movement of the latter from neutral position in either direction, forces said plate away from said one member.

13. The combination in a signal switch as set forth in claim 12 wherein said cams are V-shaped and said locking plate has similarly shaped depressions, the cam of said one and said other member, respectively, being disaligned from, respectively registering with, a depression in the neutral position of each member, and the cam of said one member registering in either operative position of the latter with a depression.

PAUL WEIEN.